United States Patent [19]

Christian

[11] 4,253,814

[45] Mar. 3, 1981

[54] PACKERHEAD AND CORE CONTROL SYSTEM

[75] Inventor: Alfred W. Christian, Woodstock, Canada

[73] Assignee: Hydrotile Canada Limited, Woodstock, Canada

[21] Appl. No.: 7,296

[22] Filed: Jan. 29, 1979

[51] Int. Cl.[3] .......... B29D 23/08; B29C 3/06

[52] U.S. Cl. .......... 425/150; 425/168; 425/427; 425/432; 425/457

[58] Field of Search .......... 425/150, 168, 427, 432, 425/457

[56] References Cited

U.S. PATENT DOCUMENTS

| | | | |
|---|---|---|---|
| 3,545,053 | 12/1970 | Besser | 425/150 |
| 3,660,003 | 5/1972 | Waddington | 425/427 |
| 3,758,245 | 9/1973 | Hermes | 425/150 |
| 3,765,173 | 10/1973 | Harris | 425/168 |
| 4,118,165 | 10/1978 | Christian | 425/432 |

*Primary Examiner*—John Parrish

*Attorney, Agent, or Firm*—Burd, Bartz & Gutenkauf

[57] ABSTRACT

A concrete pipe making machine having a packerhead vibrating core and a control for automatically controlling the movement of the packerhead and core relative to each other as the packerhead and core move up and down within a mold to form a concrete pipe. The control has valve units operable to restrict the flow of hydraulic fluid supplied to the hydraulic control cylinders which control the movements of the packerhead and core.

36 Claims, 7 Drawing Figures

PACKERHEAD AND CORE CONTROL SYSTEM

SUMMARY OF INVENTION

The invention is directed to a control means for controlling the operation of a packerhead and vibrating core concrete pipe making machine. The control means functions to automatically position the core immediately behind the packerhead during the forming of the pipe in the mold. A packerhead pipe making machine has a rotating packerhead carried by a cross head. Hydraulic cylinder means operate to move the cross head in a vertical direction to thereby move the packerhead along the longitudinal upright axis of a mold used to make concrete pipe. A secondary densification unit is used with the packerhead machine to redensify the concrete pipe and relieve the stress on the cage. The secondary densification unit includes an upright cylindrical core carrying a vibrator. Hydraulic cylinder means operate to move the core up into the mold behind the packerhead. As soon as the core has gone through the pipe, it is withdrawn by the withdrawal action of the hydraulic cylinder means. The packerhead moves down with the core until the core is out of the bell end of the pipe. The packerhead is then raised through the pipe to enable the turntable to be rotated placing the complete pipe at the offbearing station. A new form with a steel cage is carried by the turntable to the production station in vertical alignment with the packerhead and core.

The control means of the invention functions to regulate the flow of hydraulic fluid to the packerhead moving hydraulic cylinder means and the core moving hydraulic cylinder means in a manner which maintains a predetermined distance between the top of the core and the bottom of the packerhead during both the upward and downward movements of the core and packerhead. The control means is a structural and hydraulic fluid arrangement that automatically coordinates the relative movement between the packerhead and core to insure a small space between adjacent parts of the packerhead and core during the concrete pipe making process. The separation of the core isolates the packerhead from the vibrations of the core. This removes vibration forces from the packerhead support and drive structure. The packerhead rotates independently of the core. Also, the core is vibrated without dampening by the packerhead.

IN THE DRAWINGS

DESCRIPTION OF PREFERRED EMBODIMENT

Figure 1:
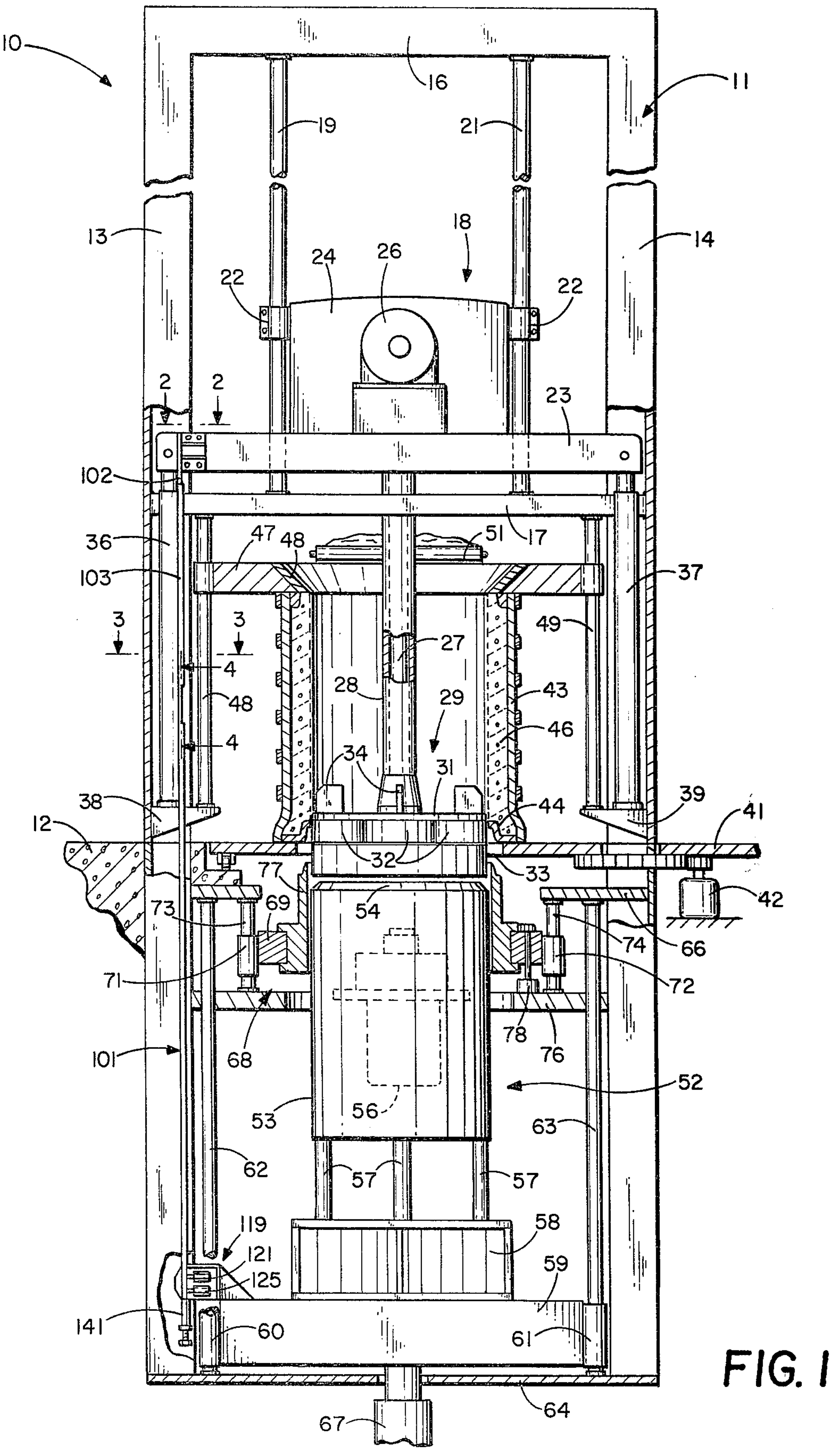
FIG. 1 is a foreshortened front elevational view of a packerhead and vibrating core concrete product making machine equipped with the packerhead and core control system of the invention.

Referring to FIG. 1, there is shown a concrete pipe making machine commonly known as a secondary densification unit indicated generally at 10. Machine 10 has a framework indicated generally at 11 attached to a base or support 12, such as a concrete foundation. Frame 11 includes a pair of spaced upright posts or I beams 13 and 14. The upper ends of beams 13 and 14 are connected with a top cross member 16. Intermediate portions of beams 13 and 14 are connected to a horizontal cross member 17.

A cross head indicated generally at 18 is movably supported on a pair of upright cylindrical guides 19 and 21. The upper ends of guides 19 and 21 are connected to top cross member 16. The lower ends of guides 19 and 21 are connected to the cross member 17. Cross head 18 has sleeves 22 containing suitable bearings for slidably mounting cross head 18 on guides 19 and 21 to permit cross head 18 to be moved in an up and down direction. Cross head 18 has a transverse base 23 supporting a power transmission or gear box 24. An electric motor 26 is drivably connected to gear box 24 to rotate a downwardly directed packerhead shaft 27. Shaft 27 supported on the bottom of gear box 24 is located within a tubular housing or sleeve 28.

A packerhead indicated generally at 29 is secured to the lower end of shaft 27. Packerhead 29 has a circular plate or disc 31 rotatably supporting a plurality of rollers 32. A cylindrical wall or flange 33 extends downwardly from rollers 32. Upwardly extended radial paddles or blades 34 are attached to the top of plate 31. Paddles 34 can be attached to the upper surface of rollers 32. Paddles 34 rotate with disc 31 to move concrete into the annular space between the packerhead 29 and mold 43.

Cross head 18 and packerhead 29 are moved up and down with a pair of elongated hydraulic cylinders 36 and 37. Cylinder 36 has a base or bottom end mounted on a bracket 38 secured to post 31. The lower end of cylinder 37 is attached to a bracket 39 secured to post 14. Each cylinder 36 and 37 can be replaced with a pair of upright piston and cylinder assemblies.

A circular turntable 41 is movably mounted on base 12 for rotation about post 14. A power unit 42, such as a motor and gear drive structure, operates to sequentially rotate turntable 41 to locate a pipe jacket or mold 43 in a production station in vertical alignment with packerhead 29. Mold 43 has a bell or lower end surrounding a pallet 44 resting on top of turntable 41. Pallet 44 can be mounted on a pallet positioner secured to turntable 41.

A top table 47 is located above mold 43. Top table 47 can be constructed with a cone-shaped member 48 and movable wiper blades (not shown) for directing concrete into the top of mold 43. An example of a top table is shown in U.S. Pat. No. 3,551,968. Top table 47 is mounted on a pair of upright tubular members or guides 48 and 49. The lower ends of guides 48 and 49 are mounted on brackets 38 and 39, respectively. The upper ends of the guides 48 and 49 are attached to cross frame member 17. Hydraulic cylinders (not shown) are attached to top table 47 and frame member 17 for raising the top table off the top of mold 43 so that mold and pipe 46 therein can be moved with turntable 41 to an unloading or off bearing position. A conveyor 51 located adjacent the top of turntable 47 is operable to move concrete from a storage area, such as a hopper, and deliver the concrete to the top table and discharge concrete into mold 43 on top of packerhead 29.

A vibrating core assembly indicated generally at 52 is located below turntable 41 in longitudinal alignment with packerhead 29. Core assembly 52 has an elongated cylindrical sleeve or core 53 having a head or closed top end 54. End 54 is located immediately below packerhead 29. The control system of the invention is operable to maintain a minimum distance or clearance between head 54 and the lower part of packerhead 29 during the formation of pipe 46. A hydraulic vibrator 56 located within core 53 is mounted on transverse support structures secured to the cylindrical walls of core 53. The hydraulic vibrator 56 located within core 53 is mounted on transverse support structures secured to the cylindrical walls of core 53. The hydraulic vibrator 56 can be the vibrator disclosed in U.S. Pat. No. 3,948,354.

A plurality of downwardly directed legs 57 attached to a base 58 connect the lower end of core 53 to an extractor table or platform 59. Platform 59 is a support or mount member for core 53. Upright sleeves 60 and 61 secured to opposite sides of platform 59 are slidably mounted on upright cylindrical rods or guides 62 and 63. Guides 62 and 63 are mounted on a horizontal base frame 64 and horizontal top frame 66. Frame 66 is part of the framework for the core assembly and a bell packer indicated generally at 68. A pair of elongated downwardly extended hydraulic cylinders 67 secured to the center portion of platform 49 function to move the platform 59 and core 63 in a vertical direction in conjunction with the vertical movement of packerhead 29. The control system includes means to control the hydraulic fluid under pressure to cylinders 67 and thereby control the up and down movement of the core 53 while maintaining a close clearance between core head 54 and the bottom of packerhead 29.

Bell packer 68 is operable to raise, rotate, and vibrate pallet 44 to finish and densify the concrete in the bell end of mold 43 during the initial stages of the forming of pipe 46. Bell packer 68 includes an annular frame 69 surrounding core 53. Frame 69 is movably mounted on a pair of upright guides or rods 73 and 74 with sleeves 71 and 72. Hydraulic cylinders (not shown) are used to raise the annular frame 69 to locate a rotatable ring 77 in driving engagement with pallet 44. A drive unit 78, including a hydraulic motor, is used to rotate the ring 77 whereby pallet 44 rotates relative to the concrete in the bell end of the pipe. This finishes and minimizes voids in the concrete in the bell end of the pipe. The guides 73 and 74 are mounted on cross frame member 76 and the top frame member 66. An example of a bell packer structure is shown in Applicant's U.S. Patent application Ser. No. 753,526, filed Dec. 22, 1976, now U.S. Pat. No. 4,118,165. Other types of bell packer structures can be used to rotate and vibrate the pallet 44.

Figure 7:
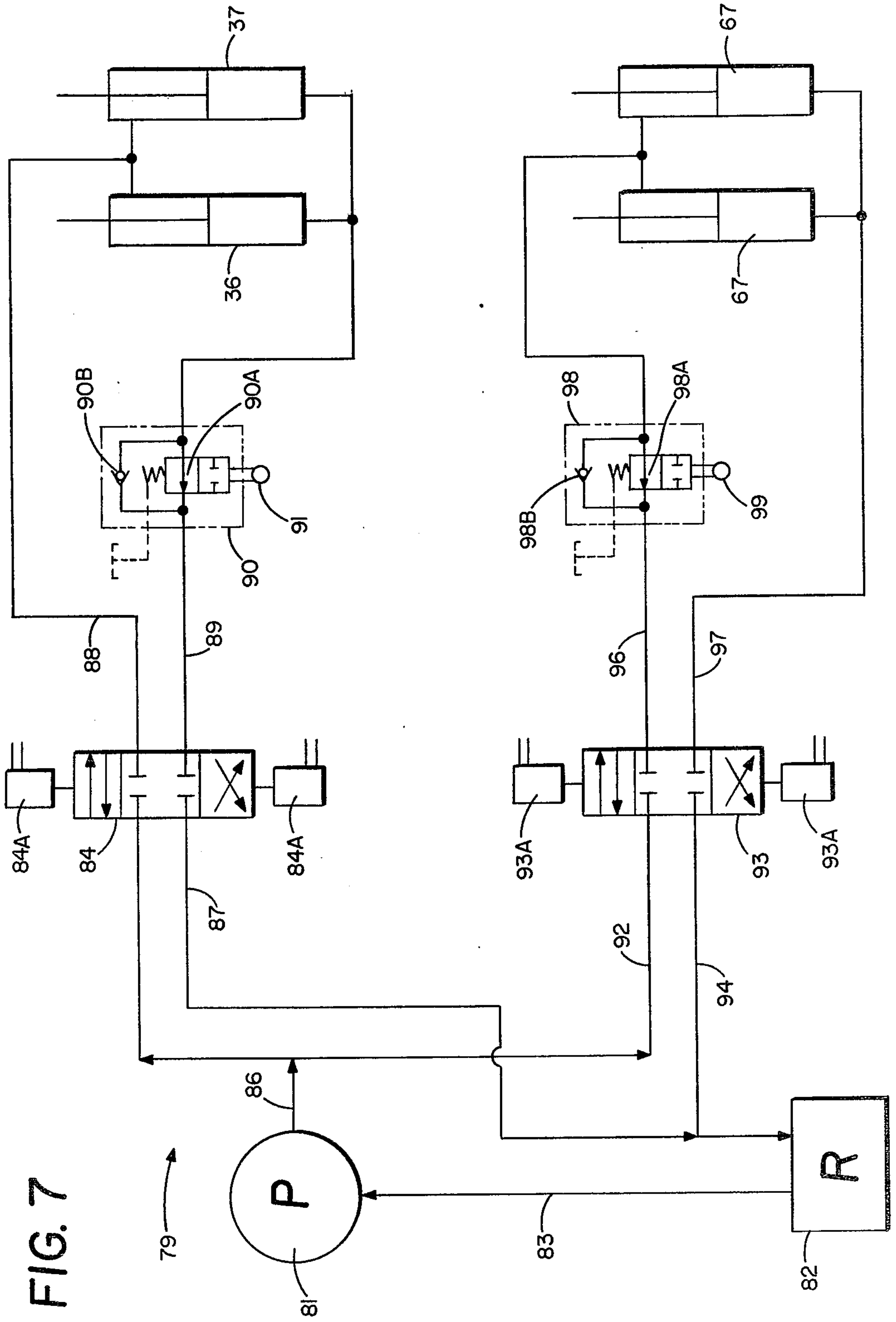
FIG. 7 is a circuit diagram of the control arrangement for the packerhead and core control system of the invention.

Referring to FIG. 7, there is shown the control arrangement for the cross head cylinders 36 and 37 and core cylinders 67. The control arrangement has a hydraulic fluid system 79 including a pump unit 81 connected to a reservoir 82 with an inlet line 83. Pump unit 81 delivers fluid under pressure to an outlet line 86. Pump unit 81 can be a pump driven by an electric motor operable to deliver 60 gpm at 1,000 psi. Other types of pumps can be used to deliver hydraulic fluid under pressure to line 86. Line 86 is connected to a valve assembly 84. Valve assembly 84 is connected with a return line 87 to reservoir 82. Valve assembly 84 has a central neutral position to block the flow of fluid to lines 88 and 89 connected to opposite ends of the cross head cylinders 36 and 37. Valve assembly 84 has a first position to direct the hydraulic fluid to the upper or rod end of the cylinders 36 and 37 and allow fluid to flow from the lower or head end of the cylinders back to reservoir 82 and a second position which reserves the flow of hydraulic fluid to and from cylinders 36 and 37. Valve assembly 84 has control solenoids 84A operable to control its operating positions.

A control valve 90 is located in line 89. Control valve 90 has a restricted flow throat or passage 90A connected to a line or hose 91 carrying supply control hydraulic fluid to valve 90. The flow of hydraulic fluid through passage 90A is restricted with a movable plunger operated with the control hydraulic fluid. Line 91 carrying the control hydraulic fluid leads to first control valve 121 hereinafter described. Valve 90 has a one-way check valve 90B allowing unrestricted flow of fluid to the head ends of cylinders 36 and 37 and restricting return flow of fluid therefrom. Return flow must flow through passage 90A so that the rate of flow of return hydraulic fluid through passage 90A controls the speed of the down operation of cylinders 36 and 37.

A line 92 is connected to the pump output and a second solenoid operated valve assembly 93. Valve assembly 93 functions to control the flow of hydraulic fluid to and from core cylinders 67. A return line 94 connects valve assembly 93 to reservoir 82. Lines 96 and 97 connect valve assembly 92 to the rod ends and head ends of cylinders 67, respectively. Valve assembly 93 has solenoids 93A operable to control its operating positions.

A control valve 98 interposed in line 96 has a variable or adjustable throat or passage 98A to restrict the flow of hydraulic fluid in line 96. Valve 98 has a movable plunger operable in response to a control hydraulic fluid under pressure. The control hydraulic fluid is carried by a line 99 leading to a second control valve 125. Valve 98 is operable to regulate the flow of fluid out of the head or upper ends of cylinders 67. Valve 98 also has a one-way check valve 98B allowing free flow of fluid to the rod ends of cylinders 67 and restricting the return flow of fluid from the rod ends of cylinders 67. The rate of return flow of hydraulic fluid through passage 98B controls the speed of the up operation of cylinders 67.

Returning to FIG. 1, a coordinating control apparatus indicated generally at 101 is operable to control the operation of valves 90 and 98 in conjunction with the movement of cross head 18 relative to the movement of core 53. Apparatus 101 is operable to control the upward movement of core 53 below packerhead 29 so that the core 53 follows in a close relationship the packerhead 29 as it moves up jacket 43 to form the concrete pipe. Apparatus 101 also controls the downward movement of packerhead 29 as packerhead 29 and core 53 move down through the pipe. The relative movements of core 53 and packerhead 29 are controlled to maintain a close clearance distance between core head 54 and the bottom of packerhead 29.

Figure 2:
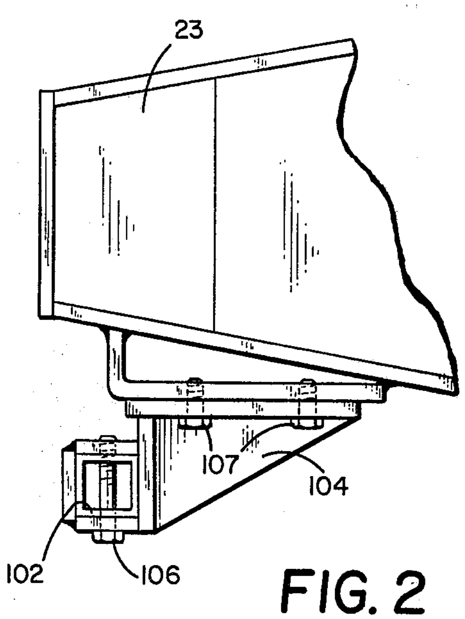
FIG. 2 is an enlarged sectional view taken along the line 2—2 of FIG. 1.
Figure 3:
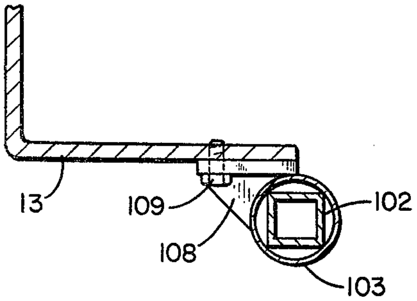
FIG. 3 is an enlarged sectional view taken along the line 3—3 of FIG. 1.

Apparatus 101 has a first upright square rod 102 movably mounted in an upright tube or protective cylindrical casing 103. As shown in FIG. 2, a bracket 104 accommodates the upper end of rod 102. A bolt 106 connects tube 102 to bracket 104. A plurality of bolts 107 mount bracket 104 on the end of cross head 23. As shown in FIG. 3, tube 103 is connected to post 13 with a plurality of brackets 108. Each bracket 108 is connected with a bolt 109 to post 13.

Figure 4:
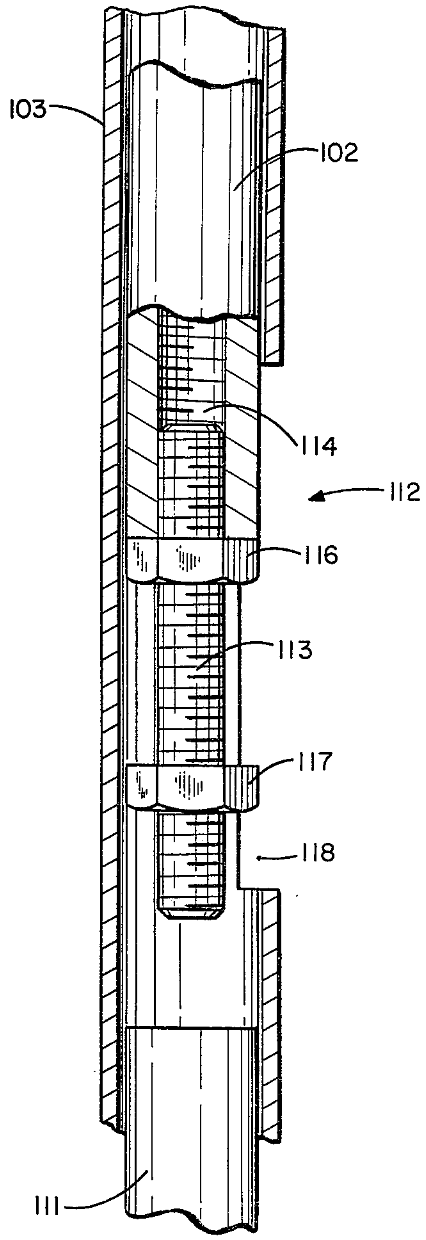
FIG. 4 is an enlarged sectional view taken along the line 4—4 of FIG. 1.

Referring to FIG. 4, a second rod 111 is movably located in tube 103 below rod 102. A length adjustment means 112 comprising a threaded rod 113 is threaded into a threaded bore 114 in the lower end of rod 102. A nut 116 locks rod 113 to rod 102. A second nut 117 secured to rod 113 guides rod 113 in the tube 103 and accommodates a wrench for turning rod 113. Tube 103 has a side opening 118 permitting the longitudinal adjustment of rod 113. Rod 113 is adjusted by releasing lock nut 116 from the end of rod 102. Nut 117 accommodates a wrench to turn rod 113 whereby the length of rod 113 relative to rod 102 is changed. The length of rod 113 determines the spacing between the bottom of packerhead 29 and the top 54 of core 53.

Figure 5:
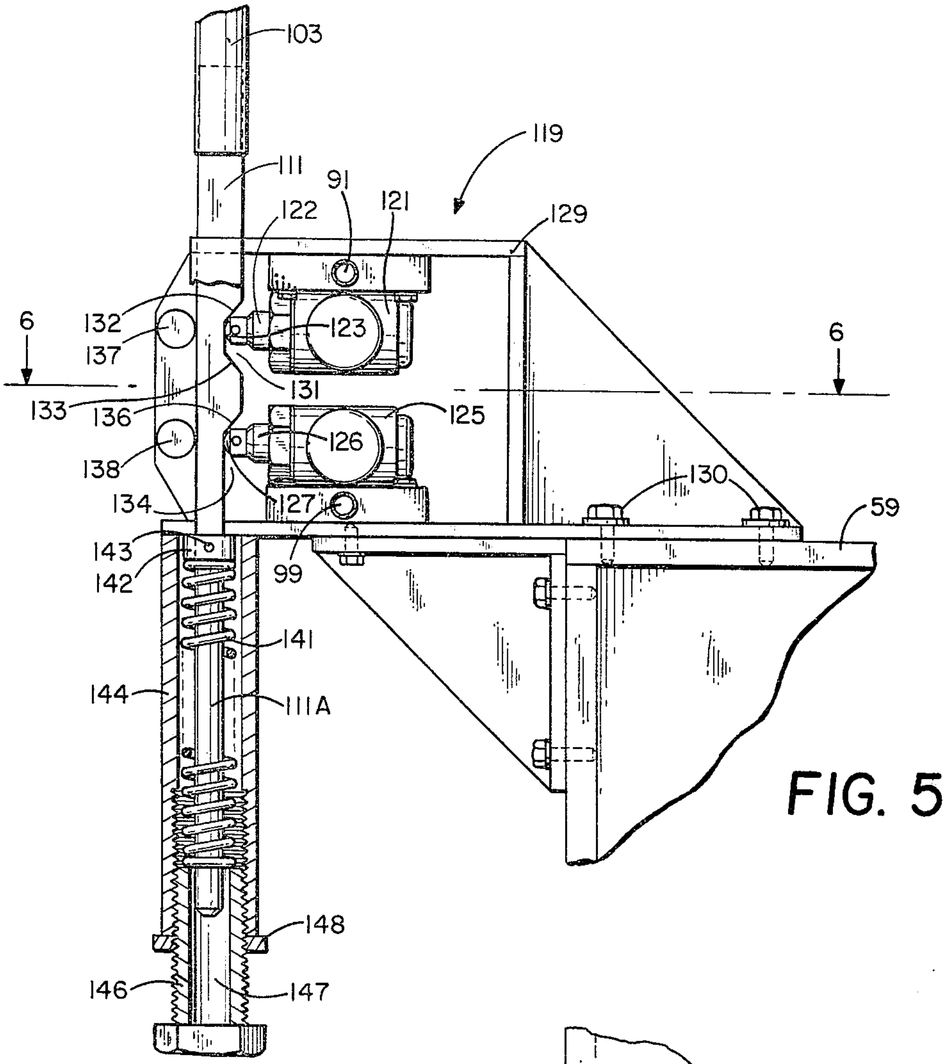
FIG. 5 is an enlarged elevational view of the valve control assembly.
Figure 6:
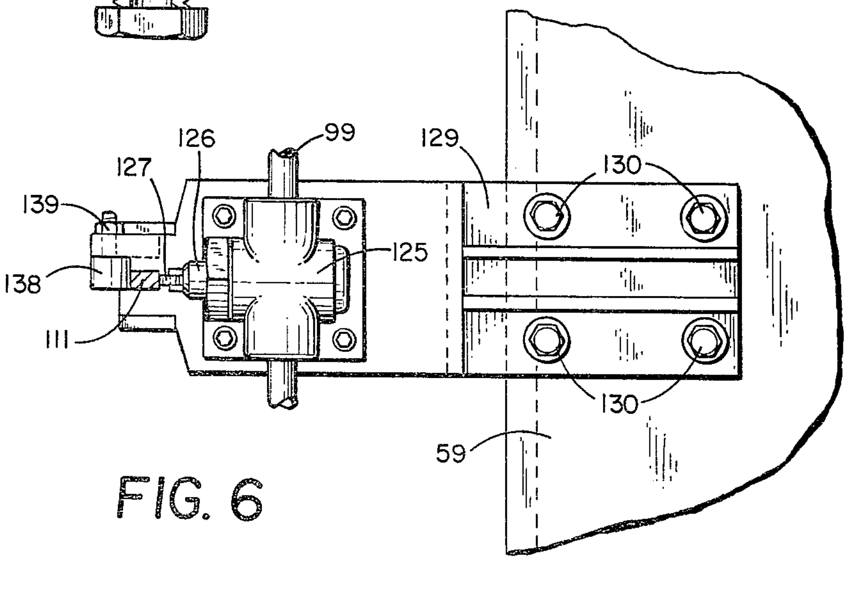
FIG. 6 is a sectional view taken along the line 6—6 of FIG. 5.

A valve control mechanism indicated generally at 119, as shown in FIGS. 5 and 6, is mounted on one end of platform 59. Valve control mechanism 119 is operable to control valves 90 and 98 in response to the relative movement between cross head 18 and core 53. Valve control mechanism 119 has a pair of control units 121 and 125 connected to lines 91 and 99, respectively, and a source of hydraulic fluid under pressure, as pump 81. Control units 121 and 125 are valves with movable plungers operable to restrict flow of fluid and check valve allowing free flow of fluid in one direction. Units 121 and 125 can be model DC-1200-S-10 valves manufactured by Parker Hannifin, Manatrol Division, Elyria, Ohio, U.S.A.

First unit 121 has a movable plunger 122 and a roller 123 mounted on the end of plunger 122.

Second unit 125 has a movable plunger 126 and a roller 127 rotatably mounted on the outer end of plunger 126. Units 121 and 125 are mounted on a bracket 129. A plurality of bolts 130 connect bracket 129 to the top of one end of platform 59.

Second control rod 111 extends downwardly adjacent rollers 123 and 127. Second control rod 111, shown in FIG. 5, has a first recess 131 aligned with roller 123. Recess 131 is formed by a first upwardly inclined side wall 132 and a second downwardly inclined side wall 133. Side walls 132 and 133 function as camming surfaces engageable with roller 123 to move the plunger 122 into unit 121 thereby restricting the flow of hydraulic fluid through the unit.

Control rod 111 has a second recess 134 aligned with the roller 127. Control rod 111 has an upwardly and outwardly inclined side 136 forming the upper side of recess 134. Side 136 functions as a cam to move plunger 126 into unit 125 to restrict the flow of hydraulic fluid through the unit. The back side of rod 111 rides on a pair of rollers 137 and 138 which hold rod 111 in contact with rollers 123 and 127. As shown in FIG. 6, a nut and bolt assembly 139 rotatably mounts roller 137 to bracket 128. A similar nut and bolt assembly (not shown) rotatably mounts roller 138 on bracket 128.

Second control rod 111 is biased in an upward direction by a compression spring 141. Spring 141 surrounds the lower end 111A of rod 111 located below bracket 129. An upper end of spring 141 bears against a collar 142 secured to rod 111 with a pin 143. A tube or sleeve 144 surrounds spring 141. The lower end of sleeve 144 accommodates a threaded member 146. The upper end of threaded member 146 engages the lower end of spring 141. Threaded member 146 has a longitudinal bore 147 which allows rod end 111A to move down into the member 146 against the biasing force of spring 141. A locked nut 148 threaded on member 146 is turned against the bottom end of sleeve 144 to lock the position of member 146 on sleeve 144. The biasing force of spring 141 is adjusted by changing the position of member 146 relative to sleeve 144.

The operation or cycle of the machine 10 is as follows. The pipe form 43 with pallet 44 and the steel reinforcing cage is initially mounted on the turntable 41 in the off bearing station. Turntable 41 is rotated with the power unit 42 to locate the form in the production station in vertical alignment with the packerhead 29 and core 53. Packerhead 29 is lowered to its lowest position with rollers 32 just above pallet 44. Hydraulic cylinders 36 and 37 are contracted to lower the cross head 18 which, in turn, positions packerhead 29 at the bottom of the mold 43. Valve 84 is operated to a position to supply fluid under pressure to the upper ends of the cylinders 36 and 37 and allow the fluid in the lower ends of the cylinders 36 and 37 to flow to the reservoir 82.

Core 53 is now raised until its upper end 54 is in close proximity to the lower end of packerhead 29. This is accomplished by supplying hydraulic fluid under pressure to the lower or lift end of the core hydraulic cylinders 67. Valve 93 is actuated to a position to allow fluid under pressure to flow to the lower ends of cylinders 67 and allow the fluid to return from the upper ends of the cylinder 67 to the reservoir 82.

Bell packer 68 is operated to engage the pallet 44. The conveyor 51 functions to feed concrete into the mold 43 above packerhead 29. The concrete is placed into the bell of the pipe by the rotating packerhead 29 and consolidated by the rotating and vibrating pallet 44.

The rotating packerhead 29 packs the barrel of pipe 46 by centrifugally placing the concrete in the pipe wall and squeezing it with the rotating rollers 32. Core 53 follows the upward travel of packerhead 29. Vibrator 26 operates constantly to thereby redensify the pipe concrete. This has the effect of relieving the stress on the steel cage. The core cylinders 67 are supplied with hydraulic fluid under pressure by pump 81. The control valve 98 functions to restrict the flow of hydraulic fluid out of the upper end of the cylinders 67, thereby controlling the upward movement of the core. Control unit 125 will be actuated if the top of end 54 of core 53 moves too close to the bottom of packerhead 29. Roller 127 will move up on the inclined side 136 of rod 111. Actuation of plunger 126 restricts the flow of hydraulic fluid into line 99 thereby actuating valve 98 to restrict the flow of fluid from the upper end of lift cylinders 67. As soon as packerhead 29 moves away from the upper end 54 of the core 53, plunger 126 will return to its normal position, as the roller 127 moves down the inclined side 136.

When core 53 has gone completely through the pipe, it is withdrawn by reversing the flow of hydraulic fluid to the core controlled cylinders 67. Control valve 84 is also actuated to move packerhead 29 down through pipe 46 along with core 53. The distance between the lower end of packerhead 29 and the top end 54 of core 53 is maintained by the operation of the coordinating control apparatus 101. If the packerhead 29 moves too close to the top end 54 of core 53, unit 121 will be actuated thereby restricting the flow of hydraulic fluid from the bottom ends of cylinders 36 and 37. Roller 123 will ride up on the inclined surface 133 of rod 111 thereby actuating the unit 121. Actuation of unit 121 causes valve 90 to restrict the flow of hydraulic fluid from the head ends of cylinders 36 and 37 thereby allowing the downward movement of packerhead 29.

As soon as the core 53 moves away from packerhead 29, roller 123 moves back into recess 131 whereby unit 121 signals the valve 91 to increase the flow of hydraulic fluid from the bottom ends of the cylinders 36 and 37. Packerhead 29 will follow the core 53 down through the completed pipe 46 without touching or bearing on the top end 54 of the core 53.

When core 53 is in its down or full retracted position, as shown in FIG. 1, packerhead 29 is raised out of the top of mold 43 by supplying hydraulic fluid under pressure to the cylinders 36 and 37. The top table 47 is lifted from pipe 46 and mold 43 when the bottom of the packerhead 29 is above table 47. Turntable 41 is then rotated by operation of the power unit 42. This places the completed pipe at the off bearing station. A new form with a steel cage and pallet is simultaneously moved into vertical alignment with the packerhead 29 and core 53 or a production station. The top table 47 is lowered onto the top of the mold 43. The cycle for forming the pipe in a new mold is then repeated.

While there has been shown and described the preferred embodiment of the concrete pipe making machine and coordinated control apparatus for the packerhead and vibrating core, it is understood that changes in the machine and control apparatus can be made by those skilled in the art without departing from the invention. The invention is defined in the following claims.

The embodiments of the invention in which an exclusive property or privilege is claimed are defined as follows:

1. A machine for making concrete pipe comprising: an upwardly extended frame, a cross head having a motor and gear box, first guide means mounted on the frame supporting the cross head for movement in a vertical direction, a packerhead connected to the gear box whereby on operation of the motor the packerhead is rotated, first hydraulic cylinder means connected to the cross head to move the cross head in said vertical direction, a turntable for supporting an upright mold in vertical alignment with the packerhead, said turntable being movable to locate the mold in an off-bearing station, an upright cylindrical core located below the turntable in axial alignment with the packerhead, vibrator means mounted on the core for vibrating the core, a support connected to the core, second guide means mounting the support for movement in a vertical direction, second hydraulic cylinder means connected to the support to move the support and core in the vertical direction, means for supplying hydraulic fluid under pressure to the first and second hydraulic cylinder means to move the packerhead and core upwardly into the mold and retract the core from the mold, means for supplying concrete to the mold during the time the packerhead moves upwardly into the mold whereby the packerhead forms a concrete pipe in the mold, control means operatively connected to the first and second hydraulic cylinder means for controlling the movement of the packerhead and core relative to each other whereby the core is maintained in closed spaced relationship below the packerhead during movement of the packerhead and core in an upward direction and during movement of the packerhead and core in a downward direction.

2. A machine for making concrete pipe comprising: an upwardly extended frame, a cross head having a motor and gear box, first guide means mounted on the frame supporting the cross head for movement in a vertical direction, a packerhead connected to the gear box whereby on operation of the motor the packerhead is rotated, first hydraulic cylinder means connected to the cross head to move the cross head in said vertical direction, a turntable for supporting an upright mold in vertical alignment with the packerhead, said turntable being movable to locate the mold in an off-bearing station, an upright cylindrical core located below the turntable in axial alignment with the packerhead, vibrator means mounted on the core for vibrating the core, a support connected to the core, second guide means mounting the support for movement in a vertical direction, second hydraulic cylinder means connected to the support to move the support and core in the vertical direction, means for supplying hydraulic fluid under pressure to the first and second hydraulic cylinder means to move the packerhead and core upwardly into the mold and retract the core from the mold, means for supplying concrete to the mold during the time the packerhead moves upwardly into the mold whereby the packerhead forms a concrete pipe in the mold, control means operatively connected to the first and second hydraulic cylinder means for controlling the movement of the packerhead and core relative to each other whereby the core is maintained in closed spaced relationship below the packerhead during movement of the packerhead and core in an upward direction and during movement of the packerhead and core in a downward direction, said control means including first valve means to restrict the flow of fluid from the lift end of the first hydraulic cylinder means, second valve means to restrict the flow of fluid from the retraction end of the second hydraulic cylinder means, and means responsive to the position of the packerhead and core relative to each other for actuating the first valve means and second valve means to maintain a selected distance between the packerhead and core during the forming of the concrete pipe.

3. The machine of claim 2 wherein: the means responsive to the position of the packerhead and core include a first unit operable to control the first valve means, a second unit operable to control the second valve means, and means operatively associated with the cross head and support for actuating the first unit responsive to the position of the packerhead relative to the core and actuating the second unit responsive to the position of the core relative to the packerhead.

4. The machine of claim 3 wherein: the means operatively associated with the cross head and support include an upright control rod assembly having an upper end connected to the cross head and a lower end operatively connected to the support, said rod assembly having a first inclined surface operatively engageable with a movable actuator of the first unit and a second inclined surface engageable with a movable actuator of the second unit, said inclined surfaces being inclined in opposite directions whereby the first unit is responsive to the position of the packerhead relatively to the core and functions to actuate the first valve means to restrict the flow of fluid from the lower ends of the first cylinders and the second unit is actuated in response to the position of the core relative to the packerhead to control the flow of fluid from the upper ends of the second cylinders, thereby controlling the lifting movement of the core.

5. The machine of claim 4 wherein: the control rod assembly is mounted for vertical movement on said support, and biasing means for biasing the control rod assembly in an upward direction whereby said control rod assembly can be moved in a downward direction relative to the support against the force of the biasing means.

6. The machine of claim 5 including: means to adjust the biasing force of the biasing means.

7. The machine of claim 4 wherein: the rod assembly includes a first rod connected to the cross head and a second rod operatively mounted on the support, and length adjusting means mounted on one rod and engageable with the other rod.

8. The machine of claim 7 wherein: the length adjusting means includes a threaded member threaded into one rod and means for locking the position of the threaded member on the one rod, said threaded member being engageable with the other rod when the top of the core and the packerhead have reached the selected separated positions.

9. The machine of claims 3 or 4 wherein: the first unit and second unit each comprise valves having movable plungers to restrict flow of hydraulic fluid and a check valve allowing free flow of hydraulic fluid in one direction, said valves being connected to a source of hydraulic fluid under pressure, first line means connecting one valve to the first valve means and second line means connecting the other valve to the second valve means.

10. A control arrangement for a packerhead and vibrating core machine for making a concrete product in a mold, said machine having a rotatable packerhead, first means to move the packerhead into and out of the mold, a vibrating core longitudinally aligned with the packerhead, and second means to move the core into and out of the mold, said control arrangement comprising: control means operatively connected to the first and second means for controlling the movement of the packerhead and core relative to each other whereby the core is maintained in close spaced relationship to the packerhead during movement of the packerhead and core in an upward direction and during movement of the packerhead and core in a downward direction.

11. The control arrangement of claim 10 wherein: the first means includes first fluid operated means, means operable to selectively move the packerhead into and out of the mold, said second means includes second fluid operated means operable to selectively move the core into and out of the mold, said control means includes first valve means to restrict the flow of fluid flowing from the first fluid operated means thereby controlling the speed of operation of the first fluid operated means, second valve means to restrict the flow of fluid from the second fluid operated means and thereby control the speed of operation of the second fluid operated means, and means responsive to the position of the packerhead and core relative to each other for actuating the first valve means and second valve means to maintain a selected distance between the packerhead and core during the forming of the concrete product.

12. The control arrangement of claim 11 wherein: the means responsive to the position of the packerhead and core include a first unit operable to control the first valve means, a second unit operable to control second valve means, and means operatively associated with the first means and second means for actuating the first unit responsive to the position of the packerhead relative to the core and actuating the second unit responsive to the position of the core relative to the packerhead.

13. The control arrangement of claim 12 wherein: the means operatively associated with the first and second means includes an upright control rod assembly having a first inclined surface operatively engageable with a movable actuator of the first unit and a second inclined surface engageable with a movable actuator of the second unit, said inclined surfaces being inclined in opposite directions whereby the first unit is responsive to the position of the packerhead relative to the core and functions to actuate the first valve means to restrict the flow of fluid from the first means and the second unit is actuated in response to the position of the core relative to the packerhead to control the flow of fluid from the second means thereby controlling the upward movement of the core.

14. The control arrangement of claim 13 wherein: the control rod assembly is mounted for vertical movement, and biasing means for biasing the control rod assembly in an upward direction whereby said control rod assembly can be moved in a downward direction against the force of the biasing means.

15. The control arrangement of claim 14 including: means to adjust the biasing force of the biasing means.

16. The control arrangement of claim 14 wherein: the rod assembly includes a first rod and a second rod, and length adjusting means mounted on the first rod and engageable with the second rod.

17. The control arrangement of claim 16 wherein: the length adjusting means includes a threaded member threaded into one rod and means for locking the position of the threaded member on the one rod, said threaded member being engageable with the other rod when the top of the core and the packerhead have reached the selected separated positions.

18. The control arrangement of claim 12 wherein: the first unit and second unit each comprise valves having movable plungers to restrict flow of fluid and a check valve allowing free flow of fluid in one direction, said valve being connected to a source of fluid under pressure, first line means connecting one valve to the first valve means and second line means connecting the other valve to the second valve means.

19. A machine for making concrete product in a mold comprising: a rotatable packerhead, first means to move the packerhead into and out of the mold, a vibrating core longitudinally aligned with the packerhead, second means to move the core into and out of the mold, control means operatively connected to the first and second means for controlling the movement of the packerhead and core relative to each other whereby the core is maintained in close spaced relationship to the packerhead during movement of the packerhead and core in an upward direction and during the movement of the packerhead and core in a downward direction.

20. A machine for making concrete product in a mold comprising: a rotatable packerhead, fluid operated first means to move the packerhead into and out of the mold, a core longitudinally aligned with the packerhead, fluid operated second means to move the core into and out of the mold, control means operatively connected to the first and second means for controlling the movement of the packerhead and core relative to each other whereby the core is maintained in close spaced relationship to the packerhead during movement of the packerhead and core in an upward direction and during the movement of the packerhead and core in a downward direction, said control means including a first valve means to restrict the flow of fluid flowing from the first means thereby controlling the speed of operation of the first means, second valve means to restrict the flow of fluid from the second means and thereby control the speed of operation of the second means, and means responsive to the position of the packerhead and core relative to each other for actuating the first valve means and second valve means to maintain a selected distance between the packerhead and core during the forming of the concrete product.

21. The control arrangement of claim 20 wherein: the means responsive to the position of the packerhead and core include a first unit operable to control the first valve means, a second unit operable to control second valve means, and means operatively associated with the first means and second means for actuating the first unit responsive to the position of the packerhead relative to the core and actuating the second unit responsive to the position of the core relative to the packerhead.

22. The control arrangement of claim 21 wherein: the means operatively associated with the first and second means includes an upright control rod assembly having a first inclined surface operatively engageable with a movable actuator of the first unit and a second inclined surface engageable with a movable actuator of the second unit, said inclined surfaces being inclined in opposite directions whereby the first unit is responsive to the position of the packerhead relative to the core and functions to actuate the first valve means to restrict the flow of fluid from the first means and the second unit is actuated in response to the position of the core relative to the packerhead to control the flow of fluid from the second means thereby controlling the upward movement of the core.

23. The control arrangement of claim 22 wherein: the control rod assembly is mounted for vertical movement, and biasing means for biasing the control rod assembly in an upward direction whereby said control rod assembly can be moved in a downward direction against the force of the biasing means.

24. The control arrangement of claim 23 including: means to adjust the biasing force of the biasing means.

25. The machine of claim 23 wherein: the rod assembly includes a first rod and a second rod, and length adjusting means mounted on the first rod and engageable with the second rod.

26. The arrangement of claim 25 wherein: the length adjusting means includes a threaded member threaded into one rod and means for locking the position of the threaded member on the one rod, said threaded member being engageable with the other rod when the top of the core and the packerhead have reached the selected separated positions.

27. The arrangement of claims 21 or 22 wherein: the first unit and second unit each comprise valves having movable plungers to restrict flow of fluid and a check valve allowing free flow of fluid in one direction, said valves being connected to a source of fluid under pressure, first line means connecting one valve to the first valve means and second line means connecting the other valve to the second valve means.

28. A control arrangement for a machine having a first movable means and a second movable means, first means to move the first movable means, said second movable means being longitudinally aligned with the first means, and second means to move the second movable means, said control arrangement comprising: control means operatively connected to the first and second means for controlling the movement of the first movable means and second movable means relative to each other whereby the second movable means is maintained in close spaced relationship to the first movable means during movement of the first movable means and second movable means in a first direction and during movement of the first movable means and second movable means in a second direction opposite the first direction.

29. The control arrangement of claim 28 wherein: the first means includes first fluid operated means operable to selectively move the first movable means, said second means includes second fluid operated means operable to selectively move the second movable means, said control means includes first valve means to restrict the flow of fluid flowing from the first fluid operated means thereby controlling the speed of operation of the first fluid operated means, second valve means to restrict the flow of fluid from the second fluid operated means and thereby control the speed of operation of the second fluid operated means, and means responsive to the position of the first movable means and second movable means relative to each other for actuating the first valve means and second valve means to maintain a selected distance between the first movable means and second movable means during concurrent movement of the first and second movable means.

30. The control arrangement of claim 29 wherein: the means responsive to the position of the first movable means and second movable means includes a first unit operable to control the first valve means, a second unit operable to control second valve means, and means operatively associated with the first means and second means for actuating the first unit responsive to the position of the first movable means relative to the second movable means and actuating the second unit responsive to the position of the second movable means relative to the first movable means.

31. The control arrangement of claim 30 wherein: the means operatively associated with the first and second means includes an upright control rod assembly having a first inclined surface operatively engageable with a movable actuator of the first unit and a second inclined surface engageable with a movable actuator of the second unit, said inclined surfaces being inclined in opposite directions whereby the first unit is responsive to the position of the first movable means relative to the second movable means and functions to actuate the first valve means to restrict the flow of fluid from the first means and the second unit is actuated in response to the position of the second movable means relative to the first movable means to control the flow of fluid from the second means thereby controlling the upward movement of the second movable means.

32. The control arrangement of claim 31 wherein: the control rod assembly is mounted for vertical movement, and biasing means for biasing the control rod assembly in an upward direction whereby said control rod assembly can be moved in a downward direction against the force of the biasing means.

33. The control arrangement of claim 32 including: means to adjust the biasing force of the biasing means.

34. The control arrangement of claim 32 wherein: the rod assembly includes a first rod and a second rod, and length adjusting means mounted on the first rod and engageable with the second rod.

35. The control arrangement of claim 34 wherein: the length adjusting means includes a threaded member threaded into one rod and means for locking the position of the threaded member on the one rod, said threaded member being engageable with the other rod when the top of the first movable means and the second movable means have reached the selected separated positions.

36. The control arrangement of claim 30 wherein: the first unit and second unit each comprise valves having movable plungers to restrict flow of fluid and a check valve allowing free flow of fluid in one direction, said valves being connected to a source of fluid under pressure, first line means connecting one valve to the first valve means and second line means connecting the other valve to the second valve means.

* * * * *

UNITED STATES PATENT AND TRADEMARK OFFICE
CERTIFICATE OF CORRECTION

PATENT NO. : 4,253,814

DATED : March 3, 1981

INVENTOR(S) : Alfred W. Christian

It is certified that error appears in the above-identified patent and that said Letters Patent are hereby corrected as shown below:

Column 4, line 6, "reserves" should be --reverses--.

Signed and Sealed this

*Seventh* Day of *July 1981*

[SEAL]

*Attest:*

RENE D. TEGTMEYER

*Attesting Officer* *Acting Commissioner of Patents and Trademarks*